Patented Mar. 14, 1944

2,343,928

UNITED STATES PATENT OFFICE 2,343,928

PRODUCTION OF COLORED FILM-FORMING MATERIALS

Robert Pierce Roberts, Spondon, near Derby, England, assignor to Celanese Corporation of America, a corporation of Delaware No Drawing. Application February 12, 1941, Serial No. 378,638. In Great Britain March 13, 1940

6 Claims. (Cl. 106—193)

This invention relates to improvements in the production of colored film-forming materials and colored textiles, films and the like. It is more particularly concerned with the coloration of film-forming materials which are soluble in organic solvents by means of vat dyestuffs.

A major consideration in the dyeing of textile materials is fastness of the colorations to scouring and in addition fastness to light and other agencies. The vat dyestuffs, e. g. of the indigoid, thio-indigoid and anthraquinone series, offer in the field of the natural textiles very considerable advantages in relation to fastness generally. However, for the major part they have little application to textiles of cellulose acetate and similar film-forming materials, since they have little or no affinity for these materials. Proposals have been made to incorporate vat dyestuffs in cellulose acetate spinning solutions so as to obtain colored filaments, but the proposals have up to the present not been applied commercially on any substantial scale, principally because of the difficulty of obtaining a good compounding of the vat dyestuff with the cellulose acetate so as to obtain a complex which is fast to rubbing and scouring.

According to the present invention, a complex of cellulose acetate or other suitable film-forming material soluble in organic solvents and a vat dyestuff eminently suitable for the production of filaments and also for the production of films, sheets and the like, is formed by intimately mixing an aqueous suspension of the free leuco compound of the vat dyestuff with a solution of the cellulose acetate or other film-forming material in an organic solvent in such proportions that, after the mixing, the cellulose acetate or the like is still in solution. After such intimate admixture, precipitation of the cellulose acetate results in the production of a complex in which the dyestuff is so intimately held that filaments, films and other products formed therefrom by shaping and setting solutions thereof or solutions of film-forming materials colored therewith are extremely fast to scouring. Further, products can be obtained in which the dyestuffs are in such finely divided form that solutions of the products can, without substantial loss of color, pass through the filters usually associated with spinning nozzles used for the spinning of artificial filaments. Moreover products can be prepared which contain high proportions of vat dye, e. g. 5 to 25 per cent or more based on the weight of film-forming material. These products are suitable for mixing with uncolored film-forming material to be used for the manufacture of colored filaments, films and the like.

In order that the dyestuff particles should be as fine as possible in the final complex of film-forming material and vat dyestuff the suspension of the leuco compound is preferably formed by acidification of an alkaline vat. The acid used for the acidification is preferably itself a solvent for the film-forming substance, as for example acetic acid or other organic acid, and may be added to the alkaline vat in such an excess that the addition of the suspension of the leuco compound in the aqueous acid to the solution of the film-forming material produces no precipitation of that material even locally. Again, instead of using sufficient acetic or other organic acid both to liberate the free leuco compound and to prevent precipitation of the film-forming material, an amount of acid may be used which is less though sufficient to liberate the free leuco compound, the balance being replaced by sufficient of another water-miscible organic liquid, e. g., acetone, to prevent precipitation of the film-forming material when the suspension of the free leuco compound is mixed with the solution of film-forming material.

Most advantageously the alkaline vat is acidified with acetic acid used in excess, and the suspension of the leuco compound in the aqueous acetic acid is added to an acetic acid solution of the cellulose acetate or other film-forming material. When a thorough admixture of the solution of the film-forming material with the suspension of the leuco compound has been obtained, the film-forming material is precipitated, and during the precipitation it carries with it the leuco compound.

The complex may then be filtered off, washed and dried in the usual way. During this process oxidation of the leuco compound takes place, and at the end of the drying process it is usually complete. Even, however, if it is not complete at this stage, when the complex is subsequently dissolved in a volatile organic solvent and spun into filaments in the usual way, the oxidation proceeds during the spinning process itself. In very exceptional cases it may be desirable to apply a special oxidising treatment, e. g., with hydrogen peroxide, to the filaments after spinning. However, none of the leuco compounds yet tried is so resistant as to require such after treatment.

If desired the solution of the film-forming material which has been thoroughly admixed with the suspension of the leuco vat dyestuff may be spun directly, but this is less advantageous and in such a case it may be necessary to apply a special oxidising treatment to the filaments during their formation or afterwards. In applying the vat dyestuffs according to the present invention, it is preferable, before forming the vat and precipitating the leuco compound, to free the dyes from the diluents with which the commercial products are usually associated. For this purpose, digestion with a dilute solution of hydrochloric acid for several hours at an elevated temperature is usually sufficient.

The following example illustrates the invention, the parts given being by weight.

35 parts of purified Caledon Brilliant Blue 3G (purified by digestion for several hours with 2% hydrochloric acid at 80° C.) are made into a uniform suspension in 2500 parts of water. 110 parts of caustic soda are then added, and the whole heated to 60° C. 70 parts of hydro-sulphite are added gradually while stirring. When solution of the reduced dyestuff is complete, 2500 parts of glacial acetic acid are added, followed by 3000 parts of a 10% solution of cellulose acetate in acetic acid, the whole being vigorously stirred throughout the addition. No precipitation of cellulose acetate takes place, and a fine suspension of the leuco dyestuff in the viscous solution of cellulose acetate is produced. The whole is poured into excess water so as to precipitate the cellulose acetate and the whole of the dyestuff. The complex is filtered off, washed thoroughly until free from acetic acid, and dried in the usual way. The amount of color removed from the complex during the washing operation is negligible. The complex contains considerably more dyestuff than is necessary for the production of articles with a full shade of blue, for which purpose about 0.5% of dyestuff on the weight of the cellulose acetate is sufficient. The complex is therefore used as a color master material for admixture with uncolored cellulose acetate for spinning purposes. Thus the amount of complex obtained above is suitable for the coloration of about 7000 parts of cellulose acetate dissolved in the appropriate quantity of acetone for spinning. The colored dope thus prepared is filtered in the usual way and spun into filaments which have a deep blue color.

As already indicated, the invention is applicable quite broadly to the production of materials colored with any vat dyestuffs, for example those of the indigoid, thio-indigoid, anthraquinone and dibenzpyrenequinone series. Examples of dyestuffs in addition to those mentioned above are Caledon Jade Green, Indanthrene Golden Yellow RK, Durindone Red BS, Indanthrene Brilliant Violet BBK, Caledon Red BN and Indanthrene Grey 6B.

Reference has been made to cellulose acetate as the film-forming material. The invention is applicable to the coloration of other film-forming materials and of articles made therefrom, for example cellulose propionate, butyrate, aceto-propionate, aceto-butyrate, nitroacetate, methyl, ethyl and benzyl celluloses, and polyvinyl acetate.

Having described my invention, what I desire to secure by Letters Patent is:

1. Process for the production of a colored cellulose compound which is insoluble in water, soluble in a water miscible organic liquid, and selected from the group consisting of cellulose esters and ethers, which comprises mixing an aqueous suspension of a free leuco compound of vat dye with a solution of such cellulose compound in a water miscible organic liquid in such proportions that after the mixing the cellulose compound is still in solution, and then precipitating the cellulose compound from the solution.

2. Process for the production of a colored cellulose acetate product, which comprises mixing a solution of cellulose acetate in acetic acid with a suspension of a free leuco compound of a vat dye, said suspension being made by acidifying an aqueous alkaline solution of a leuco compound of a vat dye with so much acetic acid that no precipitation of cellulose acetate occurs during the mixing, and thereafter precipitating the cellulose acetate by the action of water.

3. Process for the production of a colored cellulose compound which is insoluble in water, soluble in a water miscible organic liquid, and selected from the group consisting of cellulose esters and ethers, which comprises mixing an aqueous suspension of a free leuco compound of a vat dye with a solution of such cellulose compound material in a water-miscible organic liquid in such proportions that, after the mixing, the cellulose compound material is still in solution, and then precipitating the cellulose compound material from the solution by the action of water.

4. Process for the production of a colored cellulose compound which is insoluble in water, soluble in a water miscible organic liquid, and selected from the group consisting of cellulose esters and ethers, which comprises mixing a solution of such cellulose compound in a water-miscible organic liquid with an aqueous suspension of a free leuco compound of a vat dye containing so much water-miscible solvent for the cellulose compound that no precipitation occurs during the mixing, and thereafter precipitating the cellulose compound from its solution.

5. Process for the production of a colored cellulose aceate product, which comprises mixing an aqueous suspension of a free leuco compound of a vat dye with a solution of cellulose acetate in a water-miscible organic liquid in such proportions that, after the mixing, the cellulose acetate is still in solution, and then precipitating the cellulose acetate from the solution.

6. Process for the production of a colored cellulose acetate product, which comprises mixing a solution of cellulose acetate in a water-miscible organic liquid with an aqueous suspension of a free leuco compound of a vat dye containing so much water-miscible solvent for the cellulose acetate that no precipitation occurs during the mixing, and thereafter precipitating the cellulose acetate from its solution.

ROBERT PIERCE ROBERTS.